(Model.)
I. R. GILBERT.
Plow Clevis.
No. 238,384.
2 Sheets—Sheet 2.
Patented March 1, 1881.
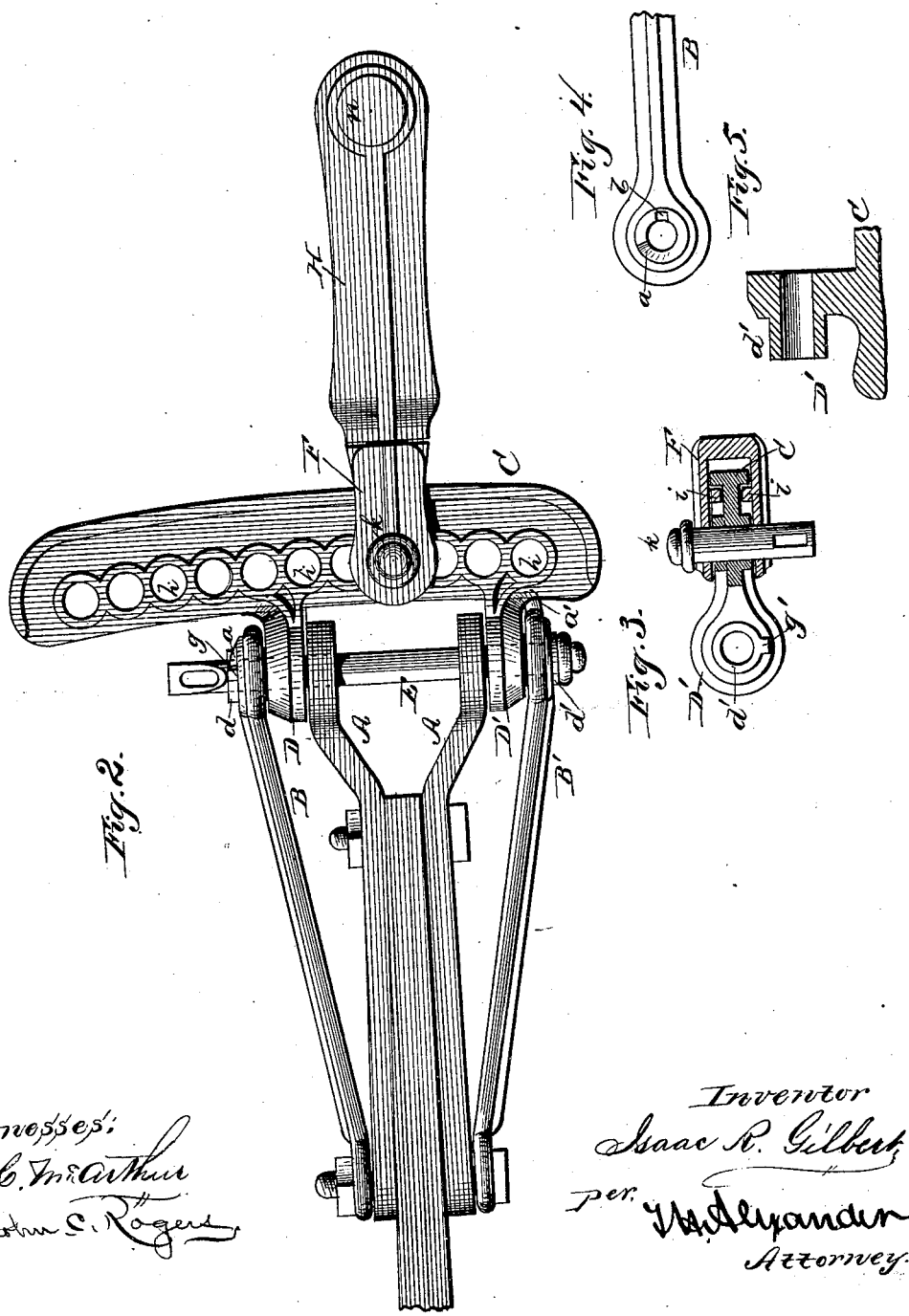
Witnesses:
H. C. McArthur
John C. Rogers
Inventor
Isaac R. Gilbert
per Wm. Alexander
Attorney

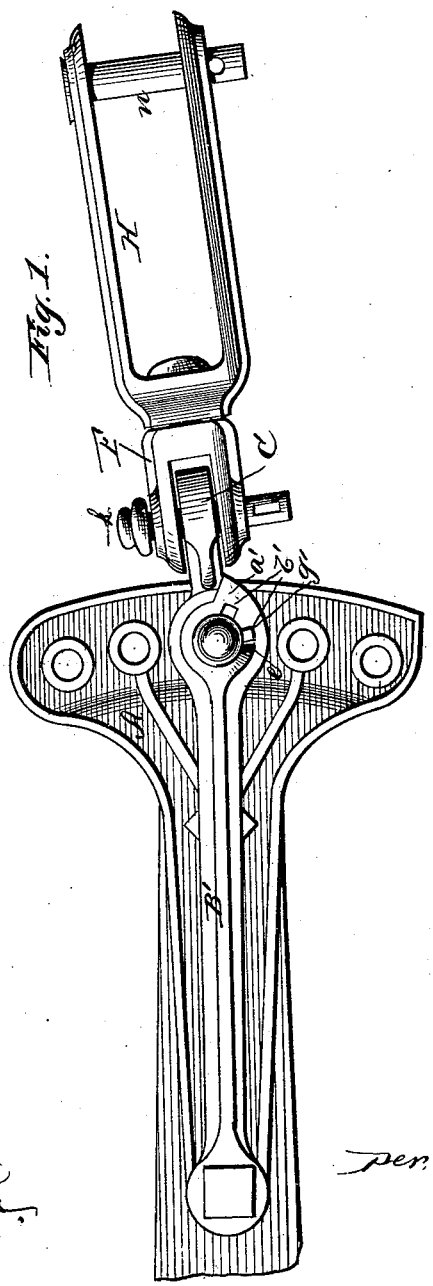

UNITED STATES PATENT OFFICE.

ISAAC R. GILBERT, OF CHARLESTOWN, INDIANA.

PLOW-CLEVIS.

SPECIFICATION forming part of Letters Patent No. 238,384, dated March 1, 1881.

Application filed November 27, 1880. (Model.)

*To all whom it may concern:*

Be it known that I, ISAAC R. GILBERT, of Charlestown, in the State of Indiana, have invented certain new and useful Improvements in Plow-Clevises; and I do hereby declare that the following is a full, clear, and exact description thereof, reference being had to the accompanying drawings, and to the letters of reference marked thereon, which form part of this specification, in which—

Figure 1 is a side elevation; Fig. 2, a plan view; and Figs. 3, 4, and 5 are detail views of parts of the same.

The object of my invention is to so construct a clevis that the line of draft may be quickly and easily changed, either vertically or horizontally, for the purpose of enabling the operator to diminish or increase the depth or width of the furrow without detaching the horses (or other power used) from the plow; and to this end it consists in the combination and arrangement of devices substantially as hereinafter described, and specifically stated in the claims.

In order that others skilled in the art may avail themselves of the benefits of my invention, I will now proceed to describe its construction and operation.

A A represent the side plates of my clevis, which are bolted to the plow-beam. The forward ends of these plates are widened out, as shown, and provided with a series of holes slightly on the arc of a circle.

B B' are side braces, loosely bolted or riveted at their rear ends to the plates A A and plow-beam. The brace B is formed with the stop or projection $a$ on its outer top side, at its forward end, and the brace B' with the projection $a'$ at its extreme forward end. Each of said braces has an enlarged forward end, through which is a suitable hole immediately in line or opposite to the series of holes in the side pieces, A A. The brace B has a small slot, $b$, at the rear side of this hole, and the brace B' a similar slot, $b'$, in the forward side of its hole, the object of which will presently be seen.

C indicates the cross-head, which is cast with ears D D', and upon these ears project outwardly at right angles bearings $d\ d'$, with suitable holes through them for the passage of the bolt E. On the upper side of the tubular bearing $d$ is cast the stop $g$, and on the lower side of the other bearing, $d'$, the stop $g'$.

The bolt E is provided at its outer end with a head, and at its opposite end with a slot for the admission of a key. It will now be observed that when the cross-head C is properly adjusted or secured to the side plates, A A, the stops or projections $a\ a'$ on the side braces, B B', will prevent it from falling, while the nibs or projections $g\ g'$ on the tubular bearings will also serve to retain the side braces in their places and prevent the detachment of the cross-head, and consequently the power, from the side plates, A A. Thus may the vertical adjustment be made, by withdrawing the bolt or pin E and again inserting it in any of the series of holes in the side plates, without disconnecting the parts.

I cast the ear D near the right end of the cross-head, and the ear D' near its center, or in such position as to neatly inclose the widened ends of the plates A A, as fully seen in the drawings.

It will thus be seen that the left end of the cross-head will project some distance beyond the plates on that side, and when a line of draft is desired farther to the right than can be had on the short end of the cross-head, the long end may be turned over to the right by separating the cross-head from the braces and interchanging the tubular bearings, as will be readily understood by reference to the drawings.

$h\ h$ represent a series of suitable bolt or pin holes through the cross-head, which are arranged on a slight curve. In front of these holes, both on top and bottom of the cross-head, is a groove or trough, which curves backward at both ends, so as to admit the shackle F being slipped off and on at either end, as will be presently more fully seen.

The shackle F is made in U shape, and its upper and lower jaws are provided on their inner sides with nibs $i\ i$, which project toward each other into the troughs or grooves in the cross-head. The rear ends of these jaws have a suitable hole, through which the pin or bolt $k$ enters, thus connecting the shackle to the cross-head, as seen in Fig. 3.

H represents a swivel-clip attached to the front end of the shackle, and is provided with pin n. This clip is secured to the double-tree, and by means of the pin may be easily and quickly connected or disconnected therefrom. The shackle may be slipped on either end of the cross-head, as the troughs thereon are formed so as to admit of this being done.

It will now be observed that the lateral adjustment can readily be effected simply by removing the pin k and pushing the shackle to the right or left, as occasion may require. While this is being done the nibs i i, being in upper and lower troughs or grooves of the cross-head, will prevent the parts from being disconnected.

It will be seen that while the device explained—consisting of the shoulder a' on the side braces—will hold the cross-head up in its proper position, many devices of substantially the same nature may be used—as, for instance, the braces may be provided with a shoulder, e, against which the nibs or projections d d' on the tubular bearings will strike and produce the same result.

Having thus fully described my invention, what I claim, and desire to secure by Letters Patent, is—

1. The combination, in a plow-clevis, of the side plates, A A, and cross-bar C, with the shackle F, having nibs i i, all constructed and arranged to operate substantially as and for the purpose set forth.

2. The cross-head C, having a series of holes therein, arranged horizontally, and a trough or groove on one or both sides, in combination with the shackle F, provided with the projections or nibs i i and bolt k, all substantially as and for the purpose set forth.

3. The cross-head C, having ears D D' and tubular bearings d d', in combination with side plates, A A, and side braces, B B', with their stops a a', all substantially as and for the purpose described.

4. In a plow-clevis, the combination of the movable side braces, B B', having projections a a' and slots b b, with the cross-head C, provided with ears D D' and tubular bearings d' d, all constructed and arranged to operate substantially as herein set forth.

5. The combination of the side plates, A A, side braces, B B', cross-head C, bolt E, shackle F, pin k, and swivel-clip H, all constructed and arranged to operate substantially as and for the purposes herein described.

In testimony that I claim the foregoing as my own I affix my signature in presence of two witnesses.

ISAAC R. GILBERT.

Witnesses:
McDOWELL REEVES,
J. C. WILSON.